United States Patent

[11] 3,610,713

[72] Inventors James Glenn Satterthwaite
 5001 Dogwood Trail, Portsmouth, Va. 23703;
 James B. Macy, Jr., 107 River Drive, Morehead City, N.C. 28557
[21] Appl. No. 864,660
[22] Filed Oct. 8, 1969
[45] Patented Oct. 5, 1971

[54] WATER LUBRICATED THRUST BEARING
 17 Claims, 7 Drawing Figs.
[52] U.S. Cl. .................................... 308/160, 115/34
[51] Int. Cl. ........................................ F16c 17/14, B63h 5/06
[50] Field of Search ........................................ 175/107; 308/135, 168, 160

[56] References Cited
UNITED STATES PATENTS
2,991,837 7/1961 Postlewaite .................. 175/107

Primary Examiner—Martin P. Schwadron
Assistant Examiner—Frank Susko
Attorney—McNenny, Farrington, Pearne & Gordon ABSTRACT: A water lubricated rubber thrust bearing is disclosed in which the rubber bearing surface is formed with a plurality of substantially flat bearing surfaces which are positioned adjacent to a mating flat annular metal bearing surface. The rubber bearing surfaces are separated by radially extending water grooves shaped to facilitate the creation of a lubricating film between the rubber and metal surfaces. The rubber surfaces are arranged so that the pressure per unit area is substantially uniform when the bearing is loaded and the effective area of the bearing is at least equal to about one-half of the area of the associated metal bearing surface.

INVENTORS
JAMES GLENN SATTERTHWAITE,
& JAMES B. MACY, JR.
BY
McNENNY, FARRINGTON, PEARNE & GORDON
ATTORNEYS

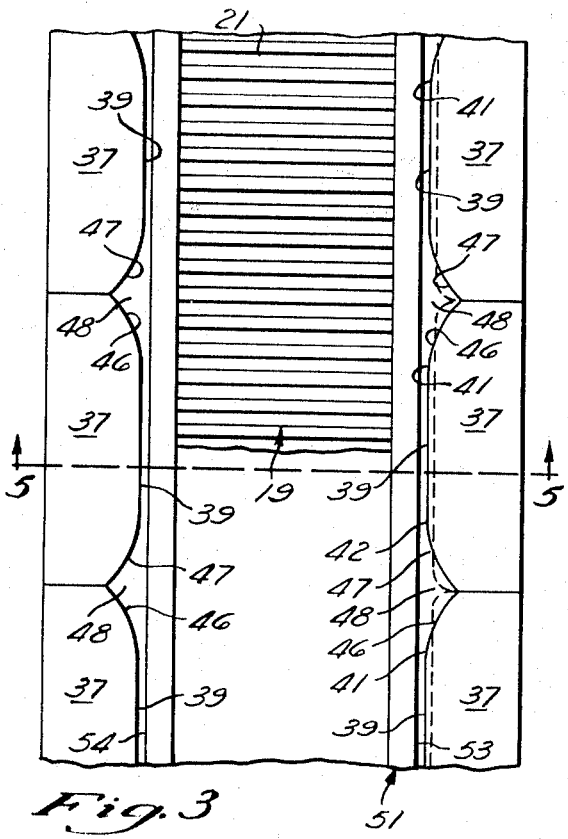
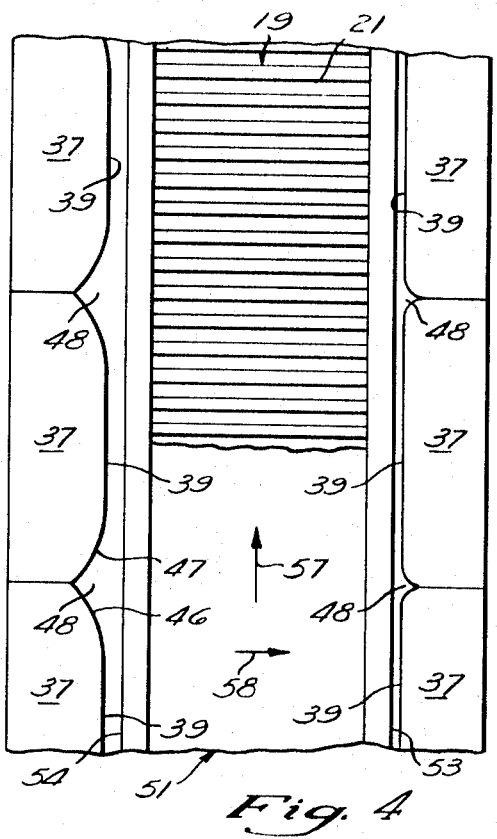
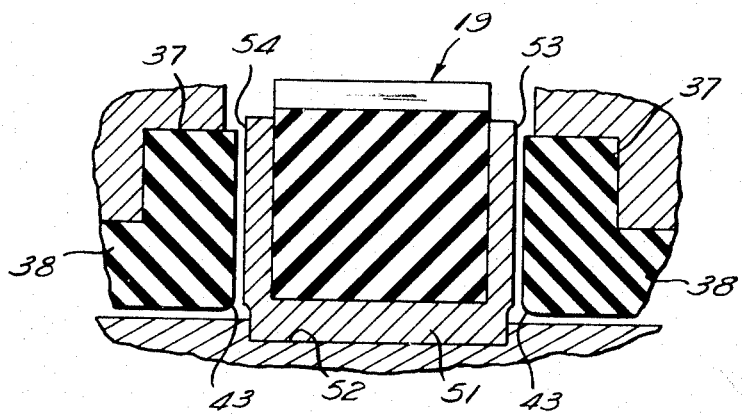

WATER LUBRICATED THRUST BEARING

BACKGROUND OF THE INVENTION

This invention relates generally to bearings and more particularly to a novel and improved high-capacity water lubricated thrust bearing. The illustrated embodiments of this invention are particularly suited for use in marine propulsion systems or the like.

PRIOR ART

In the past, water lubricated rubber bearings have been used to journal propeller shafts of ships and have been used to some extent in pumps or the like. Such bearings have been found to provide very low friction and have provided a very satisfactory service life even when operated in relatively dirty water. Examples of such bearings are described in the U.S. Letters Pat. Nos. 1,885,339 and 1,919,375.

In some instances, water lubricated bearings have been proposed for use as thrust bearings. For example, the U.S. Pat. No. 2,272,128 to Osbourne illustrates a structure for journaling a marine propeller in which a water lubricated "Cutless" rubber bearing is utilized to journal the propeller. In this structure, it is proposed to provide a water lubricated "Cutless" rubber bearing to absorb the propeller thrust. However, insofar as we are aware, water lubricated rubber thrust bearings have not achieved any commercial use. This is probably because "Cutless" type water lubricated rubber bearings are not capable of satisfactorily supporting large loads.

In the past, it has been generally believed that the lubrication phenomenon occuring in water lubricated rubber bearings was similar hydrodynamically to the lubricating phenomenon occurring in typical metal bearings utilizing oil as the lubricant. Therefore, it has been assumed that it has been necessary to arrange the bearing structure to facilitate the formation of a Reynolds wedge. Consequently, "Cutless" type water lubricated rubber bearings have been arranged to provide a bearing surface on the rubber which converges with the mating surface. In such structures, the rubber bearing surface has been provided by a plurality of surface segments separated by water grooves. Each surface segment has been shaped to converge toward the mating metal surface and then diverge therefrom. In such a structure, the effective area of the bearing is extremely small and the load capacity of the bearing is consequently very small. In "Cutless" shaft journal bearings, the practice has been to form the bearing surface segments either as planar surfaces or convex surfaces, both types of which cooperate with the cylindrical shaft to provide this converging and diverging relationship. Such shapes provide only line contact with the shaft until substantial loading occurs and after loading a substantial pressure gradient is created across the sliding surface in the plane of rotation.

SUMMARY OF THE INVENTION

With the present invention, a water lubricated thrust bearing is provided which is capable of operating under relatively heavy loading conditions. The bearing incorporating this invention is arranged to insure that a lubricating film of water is established and maintained between the opposed bearing surfaces to maintain separation therebetween. Further, the bearing is arranged so that the load on the film is distributed relatively uniformly over a substantial sliding surface area so that relatively high loads can be carried by the bearing without breaking the film and without producing destructive contact between the mating bearing surfaces.

In the illustrated embodiments, the thrust bearings include a smooth, radially extending metal bearing surface positioned adjacent to a rubber bearing surface consisting of a plurality of bearing zones or surfaces symmetrically positioned around the axis of rotation. Each of the rubber bearing surfaces is formed with a flat portion of which is substantially parallel to the flat metal surface and is relatively uniformly loaded when the bearing is loaded. These flat portions are spaced from each other by water grooves which are shaped to facilitate the establishment of a lubricating film of water between the parts when relative rotation occurs.

The rubber forming the bearing zones or surfaces is sufficiently soft so that the film can deform the rubber to a limited extent as said axial loading is applied to the bearing.

However, since the mating surfaces of the rubber and metal are substantially parallel over a substantial area, a large axial load is uniformly distributed over the relatively large effective area of the bearing without causing excessive localized loads to be applied to the lubricating film. Because excessive localized loads are not applied to the lubricating film, the film is not broken and destructive contact between the metal and the rubber does not occur, even though the total load applied to the bearing is very large. Preferably, the structure of the bearing is arranged so that the effective area of the bearing is at least equal to about one-half of the total area of the corresponding metal bearing surface.

In one illustrated embodiment, the bearing surfaces on the rubber when unstressed are parallel to the mating metal surface.

In the second embodiment, a slight convergence in a radial direction is provided. With this arrangement, the load on the film increases somewhat in a radial direction. However, the film adjacent to the periphery of a given bearing is capable of withstanding greater loading per unit area, since higher relative velocities exist adjacent to the periphery and since the centrifugal force of rotation tends to create higher static pressures in the lubricating film adjacent the periphery.

This latter bearing configuration therefore results in a variation in the film loading which conforms to variations in the film strength to produce the maximum load carrying capacity for a given bearing envelope.

BRIEF DESCRIPTION OF THE DRAWINGS

FIG. 3 is a schematic view of the thrust bearing illustrating the structure when the bearing is not loaded and illustrating in dotted line, the deformation which occurs in the rubber due to axial loading on the bearing;

FIG. 4 is a view similar to FIG. 3 illustrating the bearing under a loaded condition;

FIG. 5 is a fragmentary section taken generally along 5—5 of FIG. 3;

Referring to FIGS. 1 and 2, one illustrated embodiment of this invention includes a marine propeller 10 provided with a peripheral shroud 11 journaled for rotation about its central axis 12 in a nozzle assembly 13. The nozzle assembly 13 is secured to the ship structure, schematically represented at 14. The shroud 11 is radially supported by a water lubricated journal bearing 16 and is axially located by opposed water lubricated thrust bearings 17 and 18 which engage opposite sides of a radially extending flange assembly 19. The flange assembly 19 extends completely around the shroud 11 and is provided with gear teeth 21 which mesh with, and are driven by, a water lubricated drive gear 22. A peripheral drive unit for powering the drive gear 22 includes a shaft 23 journaled in the nozzle assembly. Forward gears 24 and 26 connect the shaft 23 with the drive gear 22 through a clutch 27. Reverse gears include a gear 28 on the shaft 23, an idler gear 29, and a driven gear 31. A second clutch 32 is operable to connect the gear 31 to the drive gear 22. Reference may be made to our pending application, Ser. No. 603,817, filed Dec. 22, 1966, for a more detailed discussion of a peripherally driven propeller system of the type illustrated.

Referring to FIG. 2, the thrust bearing 17 includes a plurality of radially extending stave elements. In the illustrated embodiment, the stave elements 36 include a radial portion 37 and an axial portion 38, since both radial and axial support of the shroud 11 is provided. However, in instances where only thrust bearing functions are required at a particular location, the axially extending portion of the stave would not be necessary. Each of the radially extending portions is provided with a flat end face 39 extending from a radial junction line 41 to the radial junction line 42 and from an inner edge 43 to the outer edge 44. This flat portion 39 is parallel to the mating surface of the flange assembly 19 when the bearing is not subjected to axial loading. Each radial section 37 is also formed with rounded portions 46 and 47 which converge toward the flange assembly 19 and blend into flat portions at the associated junction lines 41 and 42, respectively. Each curved section cooperates with the adjacent curved section to define a radially extending water groove 48 between each flat surface 39.

Figures 1, 2:
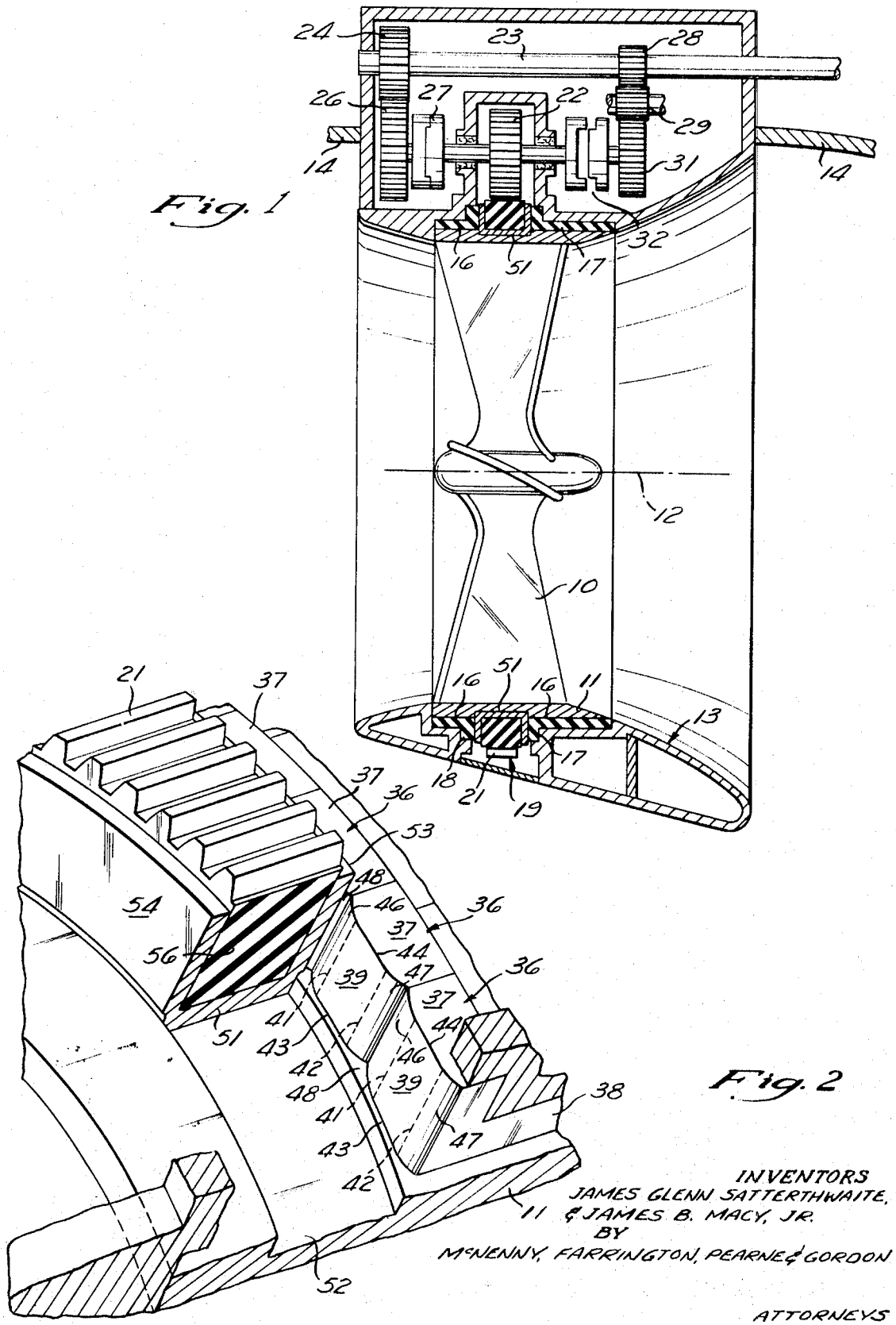
FIG. 1 is a side elevation in longitudinal section of a peripheral drive marine propeller system incorporating a thrust bearing in accordance with this invention.
FIG. 2 is an enlarged fragmentary perspective view with parts broken away for purposes of illustration, illustrating the structure of the thrust bearing.

The flange assembly in the illustrated embodiment includes a U-shaped metallic bearing element 51 suitably fastened into a groove 52 in the shroud 11. The bearing member 51 provides opposed radially extending smooth annular bearing surfaces 53 and 54. Located within the bearing element 51 is a rubber gear segment 56 providing the teeth 21 for the drive. It should be understood that the bearing surfaces 53 and 54 may be provided by any suitable radially extending projection or flange provided on a shaft or the like, and that the particular assembly including the gear sectors 56 is not required in a thrust bearing in accordance with this invention. It should also be understood that the thrust bearing 18 includes similar stave elements, even though they have been deleted in FIG. 2 for purposes of illustration.

Referring now to FIGS. 3 through 5, the spacing between the flat bearing sections 39 of the two thrust bearing assemblies 17 and 18 is slightly greater than the spacing between the metallic bearing surfaces 53 and 54 to provide clearance.

As the propeller commences to rotate, water from the water groove 48 is carried by the metal surfaces due to its adhesion therewith, along the converging surfaces 46 or 47 into the zone between the metal surfaces 53 or 54 and the adjacent bearing sections 39. These converging surfaces 46 and 47, which blend into the flat surfaces 39, facilitate the formation of a lubricating film. It should be understood that in a propeller installation of the type illustrated, forward rotation of the propeller produces a thrust urging the rim assembly 19 to the right as viewed in FIGS. 3 and 4, and reverse rotation urges the flange assembly in the opposite direction toward the bearing 18. Therefore, only one of the thrust bearings 17 or 18 functions at a given time to absorb axial thrust. FIG. 4 illustrates the condition of rotation of the flange assembly 19 in the direction of the arrow 57 which produces an axial thrust on the bearing in the direction of the arrow 58.

Because water has a high adhesion or electrostatic attraction to metal, the metal passing the water grooves 48 is thoroughly wetted and carries a film of such water into the bearing zone. Rubber, on the other hand, is hydrophobic in that it has little or no surface attraction with respect to water. Consequently, the water film is carried into the bearing zone between the water grooves and establishes a lubricating film which maintains a spacing between the rubber surface and the metal surface. As the axial load created by propeller thrust increases with increases in propeller speed, the lubricating film is loaded and causes an axial deformation of the staves 37 to a condition illustrated in FIG. 4. This deformation, for comparison purposes, is illustrated by the dotted line in FIG. 3.

As the staves deform, the area of the parallel surfaces is increased in that the water grooves become somewhat smaller and the area of the flat section of the stave is increased. Therefore, the effective area of the film supporting the axial load is increased with load. Further, the strength of the film increases with velocity, so an ideal condition exists. At very low bearing velocities the axial load is small because the propeller does not develop a great deal of thrust. As the propeller speed increases and consequently causes an increase in thrust, the film strength of lubrication is increased and the effective area of the bearing is increased. Consequently, satisfactory lubrication is insured. Because the rubber of the stave is deformed substantially uniformly, an even pressure distribution occurs across the entire bearing face. Therefore, areas of excessively high-film loading do not occur and the lubricating film has sufficient strength to maintain separation between the rubber and the mating metal parts.

Figure 7:
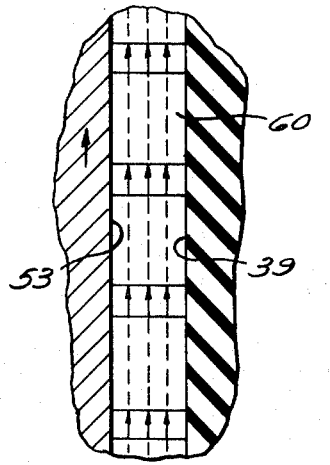
FIG. 7 is a greatly enlarged schematic illustration of the type of lubricating flow believed to exist in a bearing incorporating this invention.

It is believed that in operation, the flat surface of the stave remains exactly parallel to the mating metal surface and that the classic Reynolds wedge does not occur. Instead, it is believed that a steady flow multilayer phenomenon, as illustrated in FIG. 7, occurs wherein a single boundary layer type of flow is approached. In such flow the entire lubricating film 60 moves substantially with the velocity of the metal bearing surface 53 and there is no significant boundary layer adjacent to the flat rubber surface 39. This flow condition is pictorially represented by arrows in FIG. 7. This type of flow is believed to exist because water has a strong surface attraction with respect to metal, but has essentially no surface attraction with respect to smooth molded rubber. Because the rubber is resilient, concentrated loading of the lubricating film cannot occur due to the parallel surface design. Any tendency for concentrated loading increases deformation of the rubber in such area and results in a decrease of the loading on film and an evening of the pressure distribution along the effective area of the bearing.

In the illustrated embodiment, the effective area of the bearing even under light loading conditions is equal to at least about 50 percent of the area of the mating metal surface and as the loading on the bearing increases, the effective area of the bearing increases correspondingly. Under heavy loading conditions, the effective area of the bearing is substantially more than 50 percent of the corresponding metal area.

It should be understood that although the illustrated embodiment involves a peripherally driven propeller, a bearing incorporating this invention can be used to absorb the thrust load of other devices. For example, a solid shaft may be provided with a radial surface providing the metal bearing surface for operation in conjunction with a water lubricated rubber thrust bearing. It should also be noted that although this invention is discussed in conjunction with a structure involving metal for one bearing surface, rubber for the other bearing surface and water as lubricant, this invention can be applicable to bearings utilizing other materials and other lubricants providing one of the bearing surface materials provides a much higher surface adhesion or electrostatic attraction with respect to the lubricant, than the other bearing material, and the lubricant has the quality of being carried through the operative area of the bearing in a manner similar to the water of the illustrated bearing.

Figure 6:
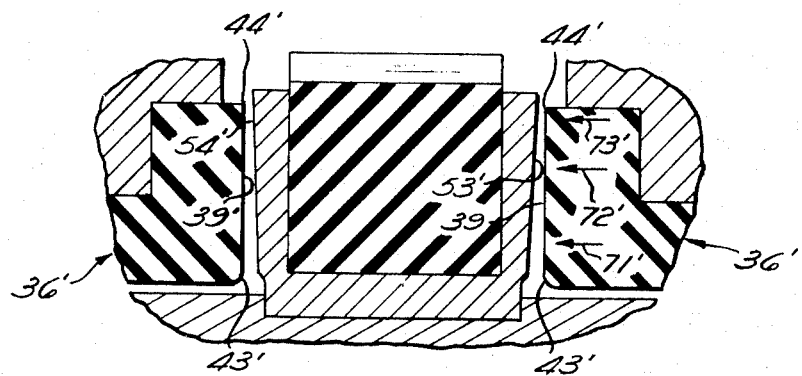
FIG. 6 is a fragmentary section similar to FIG. 5 but illustrating an embodiment wherein the mating surfaces are formed, when unstressed, so that they converge slightly in a radial direction.

Reference should now be made to FIG. 6, which discloses a second embodiment of this invention. Similar reference numbers are used to refer to similar parts, but a prime (') is used to indicate reference to the second embodiment. The staves 36' are again formed with the same shape as the embodiment of FIGS. 1 through 5. However, the radially extending metal bearing surfaces 53' and 54' are formed with a very shallow conical shape so that they converge toward the associated rubber surfaces as they extend radially out from the axis of the bearing surfaces. In this bearing structure, axial loading produces a higher pressure per unit area adjacent to the periphery of the bearing than exists at a location inwardly from the periphery. However, the relative velocities between the bearing surfaces increase toward the periphery and a higher film strength is therefore obtained in the lubricating film adjacent to the periphery. Further, centrifugal forces tend to create a higher static pressure in the film at the periphery of the bearing. Consequently, the load on the film is greatest adjacent to the periphery of the bearing and is greatest at the location where the film has the greatest capacity to maintain separation between the rubber and the metal bearing surfaces. With this structure, the loading of the film approaches an optimum condition in that the entire effective area of the bearing can be loaded to the value approaching the maximum load which can be supported by the film without breaking through the lubricating film in any particular area. In other words, the load applied to film is proportional to the strength of the film.

When the bearing of this embodiment is loaded, the greatest deformation occurs adjacent to the outer edge 44' and the least deformation occurs adjacent to the inner edge 43'. Consequently, even though the surface 53' converges toward the adjacent surface 39' when the bearing is unloaded, the surface 39' assumes a position substantially parallel to the surface 53' under full loading conditions. In this instance, the pressure per unit area on the bearing increases with radius as illustrated by the arrows 71', 72', and 73' with the maximum loading occurring at the periphery of the bearing and the minimum loading occurring at the radial inner edge of the bearing.

Although preferred embodiments of this invention are disclosed, it is to be understood that various modifications and rearrangements of parts may be resorted to without departing from the scope of the invention disclosed.

We claim:

1. A water lubricated thrust bearing comprising a housing assembly, a rotatable assembly in said housing assembly rotatable relative to said housing assembly about an axis, one of said assemblies being provided with a smooth first bearing surface around said axis extending radially with respect to said axis, said first bearing surface being formed of a material having substantial adhesion with water, the other of said assemblies being provided with a plurality of second bearing surfaces formed of a substantially hydrophobic material symmetrically located around axis adjacent to said first bearing surface, said second surfaces each providing a first portion which is substantially flat when unstressed, said first portion being substantially parallel to said first surface and substantially evenly loaded when said bearing is subjected to a load, each second surface providing a second portion adjacent to said first portion converging toward said first surface, and water filled passage means defined in part by said first surface and said second portion of said second surface extending between each second surface so that said first surface is wetted with water between each first portion, and load means connected to said assemblies operable to apply a substantial axial force which is a direct function of the speed of rotation urging said surfaces toward each other when said rotatable assembly is rotating.

2. A water lubricated thrust bearing as set forth in claim 1 wherein said second surfaces are formed by an elastomeric material and said first portions are subjected to a pressure which is substantially uniform when said bearing is subjected to an axial load.

3. A water lubricated thrust bearing as set forth in claim 2 wherein said first portions have a total area at least substantially equal to one-half the area of the mating portion of said first surface.

4. A water lubricated thrust bearing as set forth in claim 3 wherein axial loading of said bearing causes a deformation of said elastomeric material and causes part of said second portions to assume a position substantially parallel to said first surface and increases the effective area of said bearing.

5. A water lubricated thrust bearing as set forth in claim 2 wherein said first portions are substantially parallel to said first surface when said bearing is unloaded.

6. A water lubricated thrust bearing as set forth in claim 2 wherein said first surface and said first portions converge in a radial direction when said bearing is free of axial loading and said elastomeric material is deformed so that said first portions become substantially parallel to said first surface when said bearing is subjected to substantial axial loading.

7. A water lubricated thrust bearing as set forth in claim 6 wherein said first portions are substantially parallel to said first surface in a circumferential direction when said bearing is unloaded.

8. A water lubricated thrust bearing as set forth in claim 5 wherein said elastomeric material is rubber.

9. A water lubricated thrust bearing as set forth in claim 1 wherein said first surface is metal and is part of said rotatable assembly and said second surface is an elastomeric rubberlike material constituting part of said housing assembly.

10. A water lubricated thrust bearing as set forth in claim 9 wherein said assemblies are each provided with similar, but opposed, first surfaces and second surfaces so that the thrust bearing is capable of withstanding axial loading in both directions.

11. A water lubricated thrust bearing as set forth in claim 10 wherein said load means is a marine propeller and the axial force of said thrust bearing is a direct function of the rate of rotation of said rotatable assembly.

12. A thrust bearing comprising a housing assembly, a rotatable assembly in said housing assembly rotatable relative to said housing assembly about an axis, one of said assemblies being provided with a smooth first bearing surface around said axis extending radially with respect to said axis, said first bearing surface being formed of a material having substantial adhesion with a predetermined lubricant, the other of said assemblies being provided with a plurality of second bearing surfaces formed of a material having substantially less adhesion with respect to said predetermined lubricant symmetrically located around said axis adjacent to said first bearing surface, said second surfaces each providing a first portion which is substantially flat when unstressed, said first portion being substantially parallel to said first surface and substantially evenly loaded when said bearing is subjected to a load, each second surface providing a second portion adjacent to said first portion converging toward said first surface, and passage means filled with said predetermined lubricant defined in part by said first surface and said second portions of said second surface extending between each second surface so that said first surface is wetted with predetermined lubricant between each first portion, and load means connected to said assemblies operable to apply a substantial axial force which is a direct function of the speed of rotation urging said surfaces toward each other when said rotatable assembly is rotating.

13. A thrust bearing as set forth in claim 12 wherein said second surfaces are formed by an elastomeric material and said first portions are subjected to a pressure per unit area which is substantially uniform when said bearing is subjected to an axial load.

14. A thrust bearing as set forth in claim 13 wherein said first portions have a total area at least substantially equal to one-half the area of the mating portion of said first surface.

15. A thrust bearing as set forth in claim 14 wherein said first surface and said first portions converge in a radial direction when said bearing is free of axial loading and said elastomeric material is deformed so that said first portions become substantially parallel to said first surface when said bearing is subjected to substantial axial loading.

16. A thrust bearing comprising a housing assembly, a rotatable assembly in said housing assembly rotatable relative to said housing assembly about an axis, one of said assemblies being provided with a smooth first bearing surface around said axis extending radially with respect to said axis, said first bearing surface being formed of a material having substantial adhesion with a predetermined lubricant, the other of said assemblies being provided with a plurality of second bearing surfaces formed of a deformable material having substantially less adhesion with respect to said predetermined lubricant symmetrically located around said axis adjacent said first bearing surface, said second surfaces each providing a first portion which is substantially flat when unstressed and which is substantially parallel to said first bearing surface but axially converges therewith in a radial outward direction, each second surface providing a second portion adjacent to said first portion converging toward said first surface, and passage means filled with said predetermined lubricant defined in part by said first surface and said second portions of said second surfaces extending between each second surface so that said first surface is wetted with said predetermined lubricant between each first portion to form a film between said first surface and said first portions of said second surfaces having a film strength which is a direct function of the relative velocity therebetween, and load means connected to said assemblies operable to apply a substantial axis force urging said surfaces toward each other, said load means causing deformation of said second surface causing said first portions thereof to assume a position substantially parallel to said first surface, said deformation causing said film to be loaded with a pressure which is a direct function of the radius of the film from said axis.

17. A thrust bearing as set forth in claim 16 wherein said first surface is formed of metal, said second surfaces are formed of an elastomeric material and said predetermined lubricant is water.